May 20, 1969  L. LAUTIN  3,444,967

REINFORCED LUGGAGE HANDLE AND MOUNTING MEMBER

Filed June 21, 1967

INVENTOR
LEON LAUTIN
BY
Leonard H. King
ATTORNEY

United States Patent Office 3,444,967
Patented May 20, 1969

3,444,967
REINFORCED LUGGAGE HANDLE AND MOUNTING MEMBER
Leon Lautin, 43 White Drive N.,
Cedarhurst, N.Y. 11516
Filed June 21, 1967, Ser. No. 647,737
Int. Cl. A45c 13/26
U.S. Cl. 190—58                                2 Claims

ABSTRACT OF THE DISCLOSURE

A plastic handle having a continuous loop reinforcing wire frame. A plastic mounting member is utilized for securing the handle to luggage.

Background of the invention

This invention relates to handles suitable for attache cases and other luggage and particularly to a plastic handle having a continuous wire frame and to mounting hardware.

Plastic handles are almost universally employed for luggage handles. Thermoplastic materials are preferred and the materials commonly used are polyethylene and polypropylene. The polypropylene is preferred for this purpose as it has a more pleasant feel as contrasted to the waxy feel of polyethylene. However, polypropylene has the undesirable characteristic of becoming brittle when exposed to extreme cold. It is not uncommon to see travelers at airports attempt to lift luggage that has just come out of the hold of an aircraft only to find the handle breaking off in their hand.

U.S. Patent 3,009,551 discloses a plastic handle having a C shaped reinforcing rod. However, this handle relies on the resistance of the wire to bending for support. This necessitates the use of heavy gauge wire and the disadvantageous cost. This construction, as is pointed out in the patent, results in a resilient handle. A further disadvantaeg of prior art handles is a tendency for them to pull out of the handle mounting hardware if even slight loosening occurs. The use of an expensive metal mounting member is mandatory. The handle of this invention has a continuous wire which is captured by the handle mounting hardware. The metal shaft permits the use of simple plastic low cost mounting hardware.

The prior art utilized metal mounting hardware such as shown in U.S. 3,009,551 and U.S. 3,185,272. From the standpoint of cost, it is desired to use injection molded plastic mounting means. However, prior art handles required such massive plastic structures to provide adequate support as to be impractical. The handle of this invention has a long shaft which distributes the load over the mounting means and which is of small diameter permitting the use of a plastic mounting portion which need not be larger than the present zinc die cast mounting harware.

It is the principal object of this invention to provide an improved plastic luggage handle.

A further object is to provide a reinforced plastic handle.

A particular object of this invention is to provide an improved polypropylene luggage handle.

A further object of this invention is to provide a handle which may be attached to luggage by means of a plastic member.

A still different object is to provide a low cost handle and mounting means.

These and other features, objects and advantages of the invention will, in part, be pointed out with particularity and will, in part, become obvious from the following more detailed description of the invention taken in conjunction with the accompanying drawing which forms a part thereof.

Description of the preferred embodiments

Figure 1:
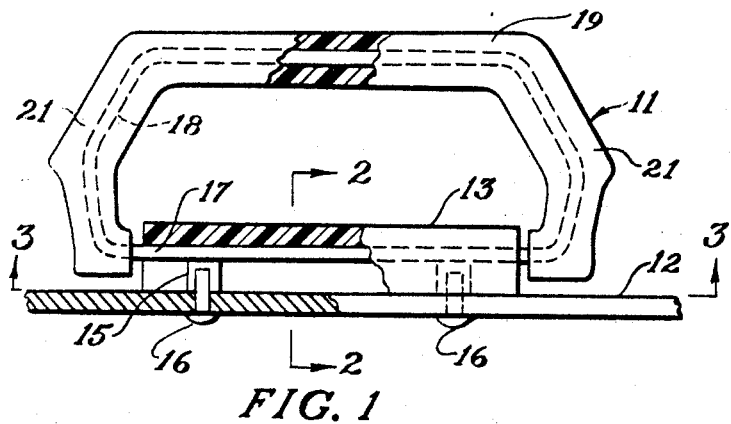
FIG. 1 is a partially sectioned longitudinal view in elevation of the handle of this invention showing the manner and means of attaching it to the top wall of a piece of luggage.
Figure 2:
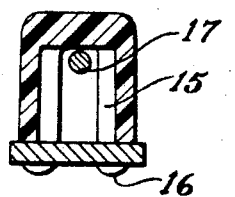
FIG. 2 is a sectional view taken in elevation along line 2—2 of FIG. 1.
Figure 3:
FIG. 3 is a bottom plan view taken along line 3—3 of FIG. 1.
Figure 5:
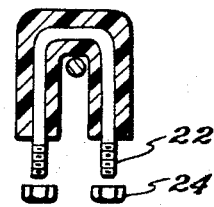
FIG. 5 is a sectional view taken in elevation along lines 5—5 of FIG. 4.

Referring now to FIGS. 1–3, there is shown a luggage handle 11 attached to a top member 12 of a piece of luggage by means of a handle mounting member 13. The handle mounting may be formed of plastic. The presently preferred plastic is ABS plastic (acrylonitrile-butadiene-styrene polymer) which can be metal plated if it is desired to simulate a metal mounting member. It is to be understood that while plastic is preferred on the basis of low cost, the mounting member may be made of metal, for example, as a zinc casting. The mounting is provided for a plurality of bosses 15 which provide bases for anchoring screws 16. The bosses serve to center wire shaft 17. Shaft 17 is part of a continuous wire reinforcing member 18 which is embedded in plastic handle 11. The handle is preferably molded of polypropylene. The handle comprises a hand hold portion 19 and a pair of angularly dependent portions 21.

Figure 4:
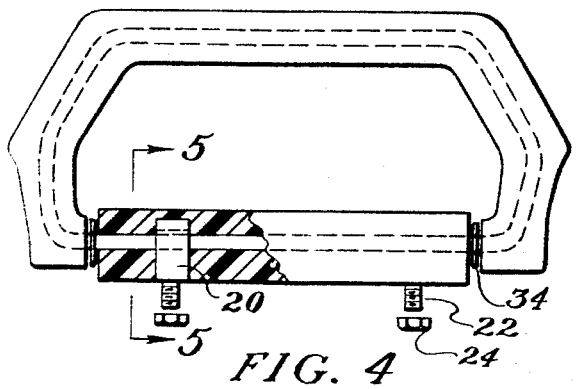
FIG. 4 is a longitudinal elevational view, partially sectioned, of the handle of this invention secured in a plastic mounting member.
Figure 6:
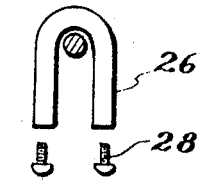
FIG. 6 is an elevational view of an insert member.
Figure 7:
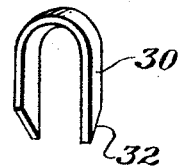
FIG. 7 is an elevational view of a different insert member.

An alternate method of securing the mounting member to the luggage is by providing the mounting member with an insert molded metal saddle member 20. As shown in FIG. 4, this member may be provided with threaded stud ends 22 to which nuts 24 may be attached. Strap 26 (FIG. 6) may have internal bores for receiving screws 28. The embedded saddle may be a simple hairpin member with prong ends 32 as shown in FIG. 7. The prongs are intended for insertion through appropriate slots in the luggage and bent over to secure the mounting member thereto.

For smooth operation and centering of the handle, washers 34 may be placed on the shaft.

Figure 8:
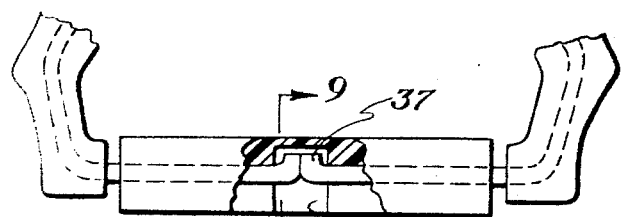
FIG. 8 is a longitudinal elevational view, partially sectioned, of a handle and plastic mounting means.

The shaft and reinforcing ring may be bent out of steel wire having a diameter of about 0.12″. A diameter of 0.08″ to 0.20″ is satisfactory. The mating portions of the loop should be welded at the joint. By bending the ends as shown in FIG. 8 and butt welding, a projection 37 is provided which rides in groove 39. The projection and groove provide a self-centering means for the handle. Instead of bending the ends, a washer could be welded between the two butt ends to form a projection for centering purposes.

Figures 9, 10:
FIG. 9 is a vertical section taken along line 9—9.
FIG. 10 is a detail in elevational view (in section) of an end portion of a handle and a handle mounting.

In FIG. 10 there is shown a portion of a modification of the conventional handle terminating in a restraining nub 36. Molds for this type of handle are readily modified to receive the reinforcing wire frame 38. In this embodiment the shaft portion provides a long bearing surface in contrast to the molded nubs 36.

There has been disclosed heretofore the best embodiment of the invention presently contemplated and it is to be understood that various changes and modifications may be made by those skilled in the art without departing from the spirit of the invention.

What I claim as new and desire to secure by Letters Patent is:

1. A luggage handle and a handle mounting means, said handle comprising a hand hold portion, legs extending angularly from said hand hold portion at opposite ends thereof, a metal rod extending from and bridging the free ends of said legs, to define a shaft and continuing through said legs and said hand hold portion, to form a complete loop; said handle mounting means comprising a body having a longitudinal channel for receiving said shaft and means for securing said mounting means to luggage.

2. A luggage handle and a handle mounting means, said handle comprising a hand hold portion, legs extending angularly from said hand hold portion at opposite ends thereof, a metal rod extending from and bridging the free ends of said legs to define a shaft and continuing through said legs and said hand hold portion, to form a complete loop and including an enlarged portion along said shaft; said handle mounting means comprising a body having a longitudinal channel for receiving said shaft and including a transverse groove for receiving the enlarged portion in a captive relationship, and means for securing said mounting means to luggage.

References Cited

UNITED STATES PATENTS

| 1,705,858 | 3/1929 | Finkelstein | 190—57 |
| 1,774,949 | 9/1930 | Shwayder | 190—57 |
| 2,177,554 | 10/1939 | Stiff | 16—127 |
| 3,009,551 | 11/1961 | Kotkins | 190—58 |

FOREIGN PATENTS

| 677,015 | 8/1952 | Great Britain. |

DONALD F. NORTON, *Primary Examiner.*

U.S. Cl. X.R.

16—126